United States Patent
Morrissey et al.

(10) Patent No.: US 6,841,294 B1
(45) Date of Patent: Jan. 11, 2005

(54) ELECTROLYTE REBALANCING SYSTEM (75) Inventors: Patrick John Morrissey, New Denham (GB); Philip John Mitchell, Loughborough (GB); Stewart Ernest Male, East Grindstead (GB)

(73) Assignee: Regenesys Technologies Limited, Wiltshire (GB)

(*) Notice: Subject to any disclaimer, the term of this patent is extended or adjusted under 35 U.S.C. 154(b) by 280 days.

(21) Appl. No.: 10/018,531
(22) PCT Filed: Jun. 30, 2000
(86) PCT No.: PCT/GB00/02536
§ 371 (c)(1), (2), (4) Date: Apr. 16, 2002
(87) PCT Pub. No.: WO01/03221
PCT Pub. Date: Jan. 11, 2001

(30) Foreign Application Priority Data

Jul. 2, 1999 (GB) .............................. PCT/GB99/02103
Nov. 30, 1999 (GB) ............................................. 9928344

(51) Int. Cl.$^7$ .............................. H01M 6/50; H01M 4/36
(52) U.S. Cl. ......................... 429/105; 429/49; 429/101
(58) Field of Search ................................. 429/101, 105, 429/49

(56) References Cited

U.S. PATENT DOCUMENTS

| 4,485,154 A | | 11/1984 | Remick et al. | |
| 5,422,197 A | * | 6/1995 | Zito | 429/51 |
| 5,439,757 A | * | 8/1995 | Zito | 429/51 |

FOREIGN PATENT DOCUMENTS

| WO | 0003448 | 1/2000 |

* cited by examiner

Primary Examiner—Carol Chaney
(74) Attorney, Agent, or Firm—Antonelli, Terry, Stout & Kraus, LLP (57) ABSTRACT

A process for rebalancing the electrolyte system in a regenerative fuel cell using a sulfide/polysulfide reaction in one half of the cell and a bromine/bromide reaction in the other half of the cell comprises passing the electrolyte containing sulfide/polysulfide or bromine/bromide through the +$^{ve}$ chamber of an auxiliary cell and passing an electrolyte containing water and being free from polysulfide or bromine through the −$^{ve}$ chamber of the auxiliary cell the auxiliary cell operating so as to oxidize sulfide ions to sulfur or bromide ions to bromine in the +$^{ve}$ chamber and to reduce water to hydrogen and hydroxide ions in the −$^{ve}$ chamber.

19 Claims, 8 Drawing Sheets

ELECTROLYTE REBALANCING SYSTEM

The present invention relates to the field of regenerative fuel cell (RFC) technology. In particular it relates to apparatus and methods for the operation of RFCs which enhance their performance characteristics.

The manner in which RFCs are able to store and deliver electricity is well known to those skilled in the art. An example of an RFC is described in U.S. Pat No. 4,485,154 which discloses an electrically chargeable, anionically active, reduction-oxidation system using a sulfide/polysulfide reaction in one half of the cell and an iodine/iodide, chlorine/chloride or bromine/bromide reaction in the other half of the cell. The two halves of the cell are separated by a cation exchange membrane.

The overall chemical reaction involved, for example, for the bromine/bromide-sulfide/polysulfide system is shown in Equation 1 below:

$$Br_2 + S^{2-} \rightleftharpoons 2Br^- + S \qquad \text{Equation 1}$$

However, within an RFC such as that described in U.S. Pat. No. 4,485,154, the reaction takes place in separate but dependent bromine and sulfur half-cell reactions as shown below in Equations 2 and 3:

$$Br_2 + 2e^- \rightleftharpoons 2Br^- \qquad \text{Equation 2}$$

$$S^{2-} \rightleftharpoons 2e^- + S \qquad \text{Equation 3}$$

It should be noted however that these equations represent the overall reactive changes occurring in the RFC. In practice the reactions are complicated by the low basicity of sulfide which results in the formation of bisulfide as the active species, as shown in Equation 4.

$$S^{2-} + H_2O \rightleftharpoons HS^- + OH^- \qquad \text{Equation 4}$$

Also, the sulfur produced in Equations 1 and 3 forms soluble polysulfide species in the presence of sulfide ions, as shown in Equation 5 (where x may be from 1 to 4).

$$S^{2-} + xS \rightleftharpoons S_{x+1}^{2-} \qquad \text{Equation 5}$$

Also, free bromine is solubilised in the presence of bromide ions to form the tribromide ion, as shown in Equation 6

$$Br^- + Br_2 \rightleftharpoons Br_3^- \qquad \text{Equation 6}$$

When the RFC is discharging, bromine is converted to bromide on the $+^{ve}$ side of the membrane and sulfide is converted to polysulfide on the $-^{ve}$ side of the membrane. Equation 1 goes from left to right and metal ions flow from the $-^{ve}$ side of the membrane to the $+^{ve}$ side of the membrane to complete the circuit. When the RFC is charging, bromide is converted to bromine on the $+^{ve}$ side of the membrane and polysulfide is converted to sulfide on the $-^{ve}$ side of the membrane. Equation 1 goes from right to left and metal ions flow from the $+^{ve}$ side of the membrane to the $-^{ve}$ side of the membrane to complete the circuit.

The discharge/charge cycle described above will be repeated many times during the lifetime of the RFC and in order for the RFC to work efficiently throughout its lifetime it is important that the electrolytes remain balanced. In the context of the present specification, when the term "balanced" is used to describe the electrolytes it means that the relative concentrations of the reactive species within the electrolytes are maintained at, or close to, values which enable optimum performance of the RFC. Similarly, in the context of the present specification, the term "rebalancing" refers to a process which alters the concentration of one or more reactive species in one or both of the electrolytes so as to return said electrolytes to a balanced state or so as to maintain said electrolytes in a balanced state.

At the beginning of the RFC's lifetime the relative concentrations of the reactive species on either side of the membrane will normally be fixed so that the electrolytes are balanced. However, once the RFC begins to operate in its repeating discharge-charge cycle, factors may intervene which result in the electrolytes becoming unbalanced. These factors will vary depending upon the identity of the reactive species within the electrolytes and on the manner in which the RFC is constructed and operated.

In the case of the bromine/bromide-sulfide/polysulfide RFC such as that described above, the most important factor which results in the electrolytes becoming unbalanced is the diffusion of unwanted species across the membrane. Although a cation selective ion-exchange membrane is used, 100% permselectivity is not possible and during extended cycling of the cell some anionic species diffuse through the membrane. In particular, sulfide ions (largely present in the bisulfide form, $HS^-$) and polysulfide ions ($S_{x+1}^{2-}$, where x may be from 1 to 4) may diffuse from the sulfide/polysulfide electrolyte into the bromine/bromide electrolyte where they will be oxidised by the bromine to form sulfate ions as shown in equations 7 and 8 below:

$$HS^- + 4Br_2 + 4H_2O \rightarrow 8Br^- + SO_4^{2-} + 9H^+ \qquad \text{Equation 7}$$

$$S_{x+1}^{2-} + (3x+4)Br_2 + (4x+4)H_2O \rightarrow (6x+8)Br^- + (x+1)SO_4^{2-} + (8x+8)H^+ \qquad \text{Equation 8}$$

Imperfections other than diffusion through the membrane which could similarly contribute to the above process are ineffective sealing between cell compartments, or catastrophic failure of any of the cell separating components, each of which may result in crossover of the electrolytes between cell compartments.

In Equations 7 and 8, the oxidation of the sulfur species goes beyond that which occurs during normal operation of the RFC. That is to say, the sulfide and polysulfide ions are oxidised all the way to sulfate ions. Consequently, in the case of sulfide ion cross-over (Equation 7), four bromine molecules per sulfide ion are consumed rather than the normal one bromine molecule per sulfide ion which is consumed in the reaction scheme of Equation 1. Similar overconsumption of bromine results from polysulfide crossover (Equation 8) although to a slightly lesser extent. As a result, the bromine/bromide electrolyte becomes discharged to a greater extent than the sulfide/polysulfide electrolyte. Thus, when the cell is discharging there is insufficient bromine present to react with all the sulfide ions present thereby preventing completion of the discharge cycle. As a result, the voltage generated by the cell begins to decline earlier in the discharge cycle than when the electrolytes are balanced. in effect, the reactions represented by Equations 7 and 8 result in the conversion of some of the polysulfide ions to sulfide because not all of the polysulfide ions are recovered on discharge. Subsequent cycles repeat this process, further reducing the number of polysulfide ions present. Ultimately, there will be insufficient polysulfide ions present to accept charge during the charge cycle. Since the electrochemistry has to continue if charging is maintained, the next most favourable reaction occurs, i.e. water is reduced and the electrode on the $-^{ve}$ side of the cell starts to gas hydrogen.

It would therefore be advantageous to provide a process for rebalancing the electrolytes in order to compensate for the unbalancing effect of the cross-over of sulfide and/or polysulfide electrolyte species into the bromine electrolyte. Although it would be possible to replace the electrolytes in the system with fresh electrolytes at periodic intervals, this is disadvantageous because of the economic implications and because of the environmental implications of the great amounts of waste electrolytes which would require to be disposed of.

Accordingly, the present invention provides an electrochemical process for energy storage and/or power delivery comprising:

(i) maintaining and circulating electrolyte flows in a fully liquid system in which the active constituents are fully soluble in a single cell or in an array of repeating cell structures, each cell with a positive ($+^{ve}$) chamber containing an inert $+^{ve}$ electrode and a negative ($-^{ve}$) chamber containing an inert $-^{ve}$ electrode, the chambers being separated from one another by a cation exchange membrane, the electrolyte circulating in the $-^{ve}$ chamber of each cell during power delivery containing a sulfide (electrolyte 1, and the electrolyte circulating in the $+^{ve}$ chamber during power delivery containing bromine (electrolyte 2), (ii) restoring or replenishing the electrolytes in the $+^{ve}$ and $-^{ve}$ chambers by circulating the electrolyte from each chamber to storage means comprising a volume of electrolyte greater than the cell volume for extended delivery of power over a longer discharge cycle than the cell volume alone would permit, and (iii) rebalancing the electrolytes by circulating a fraction of electrolyte 1 or electrolyte 2 through the $+^{ve}$ chamber of an auxiliary cell, said auxiliary cell comprising a $+^{ve}$ chamber containing an inert $+^{ve}$ electrode and a $-^{ve}$ chamber containing an inert he electrode, the chambers being separated from one another by a cation exchange membrane, the electrolyte circulating through the $-^{ve}$ chamber of the auxiliary cell containing water and being free from polysulfide and free from bromine during rebalancing, the auxiliary cell operating so as to oxidise sulfide ions to sulfur or bromide ions to bromine in the $+^{ve}$ chamber and so as to reduce water to hydrogen and hydroxide ions in the $-^{ve}$ chamber.

The oxidation of bromide to bromine rebalances the electrolytes by restoring the bromine which is reduced by reaction with migrating sulfide ions. Oxidation of bromide to bromine may also be thought of as charging the bromine/bromide electrolyte since the chemical content of the bromine/bromide electrolyte changes in the same manner as when the RFC is in its charging cycle.

The oxidation of sulfide to sulfur rebalances the electrolytes by oxidising the equivalent amount of sulfide which would ordinarily have been oxidised by the halogen which was reduced by reaction with migrating sulfide ions. Oxidation of polysulfide to sulfur may also be thought of as discharging the sulfide/polysulfide electrolyte since the chemical content of the sulfide/polysulfide electrolyte changes in the same manner as in the RFC when it is in its discharging cycle.

In order that rebalancing of the electrolytes may occur, it is essential that during the rebalancing process the electrolyte circulating through the $-^{ve}$ chamber of the auxiliary cell should be free from polysulfide and free from bromine. The reason for this is that these chemical species are more readily reduced than water. If electrolyte 1 is circulated through the $+^{ve}$ chamber of the auxiliary cell and the electrolyte circulating through the $-^{ve}$ chamber of the auxiliary cell contains polysulfide, then the reaction which will occur in the $-^{ve}$ chamber will be reduction of polysulfide to sulfide rather than reduction of water to hydrogen and hydroxide ions. This would result in no net change in the oxidation state of the sulfur species present in the system. If reduction of water is to occur in the presence of polysulfide the $-^{ve}$ electrode in the $-^{ve}$ chamber must be specially constructed to starve it of polysulfide. Similarly, if electrolyte 2 is circulated through the $+^{ve}$ chamber of the auxiliary cell and the electrolyte circulating through the $-^{ve}$ chamber of the auxiliary cell contains bromine, then the reaction which will occur in the $-^{ve}$ chamber will be reduction of bromine to bromide rather than reduction of water to hydrogen and hydroxide ions. This would result in no net change in the oxidation state of the bromine species present in the system. If reduction of water is to occur in the presence of bromine the $-^{ve}$ electrode in the $-^{ve}$ chamber must be specially constructed to starve it of bromine. Inclusion of such specially constructed electrodes is clearly undesirable from an economic and system maintenance viewpoint.

The rebalancing process may be applied continuously to the RFC wherein a sidestream of the bromine/bromide or sulfide/polysulfide electrolyte drawn from the mainstream is diverted through apparatus suitable for carrying out the rebalancing process. The rebalancing process may also be applied as a batch process wherein the fraction of the bromine/bromide or sulfide/polysulfide electrolyte which is removed from the RFC is treated in separate apparatus suitable for carrying out the rebalancing process before being returned to the RFC.

It will be understood by those skilled in the art that a number of reduction half-cell reactions may be used to counter the oxidation of the halide or sulfide. However, in the present invention, the other half-cell reaction under alkaline conditions involves the reduction of water to hydrogen and hydroxide ions according to the half-cell reaction shown in Equation 8 below:

$$2H_2O + 2e^- \leftrightarrows H_2 + 2OH^- \qquad \text{Equation 8}$$

Thus the rebalancing process may be represented by the reactions shown in Equations 9 and 10 below:

$$2Br^- + 2H_2O \leftrightarrows Br_2 + H_2 + 2OH^- \qquad \text{Equation 9}$$

$$S^{2-} + 2H_2O \leftrightarrows S + H_2 + 2OH^- \qquad \text{Equation 10}$$

Similarly in an acidic medium the half cell reaction comprises $$2H^+ + 2e^- \leftrightarrows H_2 \qquad \text{Equation 11}$$

It will be appreciated that, although the process of oxidising the bromine/bromide or sulfide/polysulfide electrolyte can be used to rebalance the electrolytes, there is still a net loss of active sulfur species from the cell. This is because the sulfide and polysulfide ions which cross to the bromine electrolyte and are oxidised to sulfate ions are not recovered. Thus, in a preferred embodiment of the present invention, the process additionally comprises adding elemental sulfur or a sulfide salt to the sulfide/polysulfide electrolyte in an amount such as to restore the initial concentration of active sulfur species.

In carrying out the process of the present invention the electrolyte circulating through the $-^{ve}$ a chamber of the auxiliary cell may be water. In this instance the electrolyte will generally circulate in a closed system and there will be no change of pH of the bromine/bromide or sulfide/polysulfide electrolyte.

In an alternative manner of carrying out the process of the present invention the electrolyte circulating through the $-^{ve}$ chamber of the auxiliary cell is a fraction of electrolyte 1 or 2 which has been made free of polysulfide or bromine by electrochemical reduction thereof. This may be achieved by recirculating electrolyte 1 or 2 through the $-^{ve}$ chamber of the auxiliary cell until all of the polysulfide or bromine has been reduced. The electrolyte circulating through the $-^{ve}$ chamber of the auxiliary cell may then be returned to the main stream of electrolyte 1 or 2.

Alternatively, the electrochemical reduction of polysulfide or bromine which may be present in electrolyte 1 or 2 respectively occurs within the $-^{ve}$ chamber of a second auxiliary cell which comprises a $+^{ve}$ chamber containing an inert $+^{ve}$ electrode and a $-^{ve}$ chamber containing an inert $-^{ve}$ electrode, the chambers being separated from one another by a cation exchange membrane, the electrolyte circulating through the $+^{ve}$ chamber being a fraction of electrolyte 1 or electrolyte 2. This may be achieved by recirculating electrolyte 1 or 2 through the $-^{ve}$ chamber of the second auxiliary cell until all of the polysulfide or bromine has been reduced. The electrolyte circulating through the $-^{ve}$ chamber of the auxiliary cell may then be returned to the main stream of electrolyte 1 or 2.

Another reason why the reduction of any bromine which may be present in electrolyte 2 is important is because, as described in WO-A-00/03448, carrying out the RFC process of the present invention results in the production of sulfate ions in the bromine/bromide electrolyte as described above with reference to Equation 7. The removal of sulfate ions from the electrolyte can only be carried out by the process as described in WO-A-00/03448 in the absence of free bromine which otherwise interferes with the process. Thus, in a preferred embodiment, the electrolyte circulating through the $-^{ve}$ chamber of the auxiliary cell during rebalancing is a fraction of electrolyte 2 and that fraction is subsequently treated to remove sulfate ions contained therein.

In carrying out the process of the present invention elemental sulfur and/or a sulfide salt may be added to the sulfide/polysulfide electrolyte in an amount sufficient to restore the initial concentration of sulfur species.

The present invention also provides for the use, in a process for energy storage and/or power delivery comprising:

(i) maintaining and circulating electrolyte flows in a fully liquid system in which the active constituents are fully soluble in a single cell or in an array of repeating cell structures, each cell with a positive ($+^{ve}$) chamber containing an inert $+^{ve}$ electrode and a negative ($-^{ve}$) chamber containing an inert $-^{ve}$ electrode, the chambers being separated from one another by a cation exchange membrane, the electrolyte circulating in the $-^{ve}$ chamber of each cell during power delivery containing a sulfide (electrolyte 1), and the electrolyte circulating in the $+^{ve}$ chamber during power delivery containing bromine (electrolyte 2), (ii) restoring or replenishing the electrolytes in the $+^{ve}$ and $-^{ve}$ chambers by circulating the electrolyte from each chamber to storage means comprising a volume of electrolyte greater than the cell volume for extended delivery of power over a longer discharge cycle than the cell volume alone would permit, of a process comprising:

circulating a fraction of electrolyte 1 or electrolyte 2 through the $+^{ve}$ chamber of an auxiliary cell, said auxiliary cell comprising a $+^{ve}$ chamber containing an inert $+^{ve}$ electrode and a $-^{ve}$ chamber containing an inert $-^{ve}$ electrode, the chambers being separated from one another by a cation exchange membrane, the electrolyte circulating through the $-^{ve}$ chamber of the auxiliary cell containing water and being free from polysulfide and free from bromine during rebalancing, the auxiliary cell operating so as to oxidise sulfide ions to polysulfide or bromide ions to bromine in the $+^{ve}$ chamber and so as to reduce water to hydrogen and hydroxide ions in the $-^{ve}$ chamber, for the purpose of rebalancing electrolytes 1 and 2.

The present invention also includes within its scope apparatus for carrying out a process as described above comprising:

(i) a single cell or an array of repeating cell structures, each cell comprising; a $+^{ve}$ chamber containing an inert $+^{ve}$ electrode and a $-^{ve}$ chamber containing an inert $-^{ve}$ electrode the chambers being separated from one another by an ion exchange membrane, an electrolyte circulating in the $-^{ve}$ chamber of each cell which contains a sulfide during power delivery (electrolyte 1), and an electrolyte circulating in the $+^{ve}$ chamber which contains bromine during power delivery (electrolyte 2), (ii) storage and circulation means for each electrolyte for restoring or replenishing the electrolytes in the $+^{ve}$ and $-^{ve}$ chambers, (iii) means for rebalancing the electrolytes comprising an auxiliary cell which comprises a $+^{ve}$ chamber containing an inert $+^{ve}$ electrode and a $-^{ve}$ chamber containing an inert $-^{ve}$ electrode the chambers being separated from one another by a cation exchange membrane, means for circulating a fraction of electrolyte 1 or 2 through the $+^{ve}$ chamber of the auxiliary cell, an electrolyte containing water and being free from polysulfide and free from bromine during rebalancing and means for circulating said electrolyte through the $-^{ve}$ chamber of the auxiliary cell.

The present invention will be further described with reference to the accompanying drawings in which.

Figure 1A:
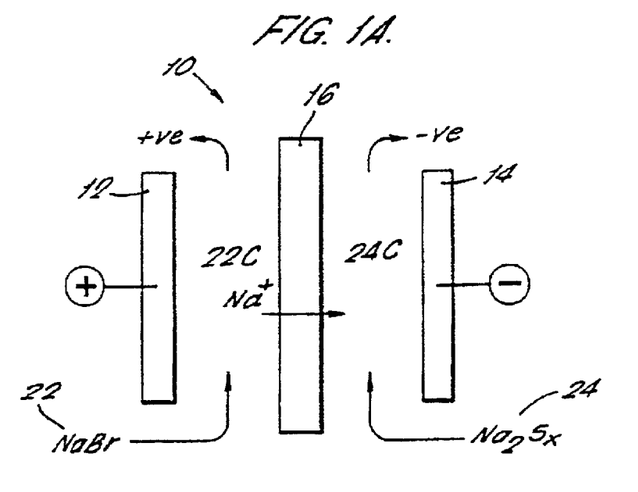
FIG. 1A is a schematic view of a basic electrochemical reduction-oxidation cell in which a sulfide/polysulfide reaction is carried out in one half of the cell and a bromine/bromide reaction is carried out in the other half of the cell.

FIG. 1A shows a cell 10 with a positive ($+^{ve}$) electrode 12 and a negative ($-^{ve}$) electrode 14 and a cation exchange membrane 16 which may be formed from a fluorocarbon polymer with sulfonic acid functional groups to provide charge carriers. The membrane 16 acts to separate the $+^{ve}$ and $-^{ve}$ sides of the cell 10 and is selected to minimize migration of bromine from the $+^{ve}$ side to the $-^{ve}$ side and to minimize migration of sulfide and polysulfide ions from the $-^{ve}$ side to the $+^{ve}$ side. An aqueous solution 22 of NaBr is provided in a chamber 22C formed between the $+^{ve}$ electrode 12 and the membrane 16 and an aqueous solution 24 of $Na_2S_x$ (where x may be from 2 to 5) is provided in a chamber 24C formed between the $-^{ve}$ electrode 14 and the membrane 16. A $K_2S_x$ solution, which is more soluble and more expensive than the $Na_2S_x$ solutions, is used in another embodiment.

When the cell is in the discharged state, a solution of NaBr of up to 6.0 molar concentration exists in the chamber 22C of the cell and a solution of $Na_2S_x$ at 0.5 to 1.5 molar, exists in chamber 24C of the cell. Higher molarity is possible with $K_2S_x$.

As the cell is charged, $Na^+$ions are transported through the cation membrane 16, as shown in FIG. 1A, from the $+^{ve}$ to the $-^{ve}$ side of the cell. Free bromine is produced via oxidation of the bromide ions at the $+^{ve}$ electrode and dissolves as a tribromide or pentabromide ion. Sulfur is reduced at the $-^{ve}$ electrode and the pentasulfide, $Na_2S_x$, salt eventually becomes the monosulfide as the charging proceeds to completion. At the $+^{ve}$ side the following reaction occurs, and at the $-^{ve}$ side the following reaction occurs, The membrane separates the two electrolytes and prevents bulk mixing and also retards the migration of sulfide and polysulfide ions from the $-^{ve}$ side to the $+^{ve}$ side, and the migration of $Br^-$ and $Br_2$ from the $+^{ve}$ to the $-^{ve}$ side. Diffusion of the sulfide and polysulfide ions across the membrane results in the electrolytes becoming unbalanced as described earlier.

When providing power, the cell is discharging. During this action, reversible reactions occur at the two electrodes. At the $+^{ve}$ side electrode 12, bromine is reduced to $Br^-$, and at the $-^{ve}$ electrode, the $S^{2-}$ ion is oxidized to molecular S. The electrons produced at the $-^{ve}$ electrode form the current through a load. The chemical reaction at the $+^{ve}$ electrode produces 1.06 to 1.09 volts and the chemical reaction at the be electrode produces 0.48 to 0.52 volts. The combined chemical reactions produce an open circuit voltage of 1.54 to 1.61 volts per cell.

The present system is an anionically active electrochemical system. Therefore, the cation which is associated with them essentially takes no part in the energy producing process. Hence, a cation of "convenience" is chosen. Sodium or potassium are preferred choices. Sodium and potassium, compounds are plentiful, they are inexpensive and have high water solubilities. Lithium and ammonium salts are also possibilities, but at higher costs.

Figure 1B:
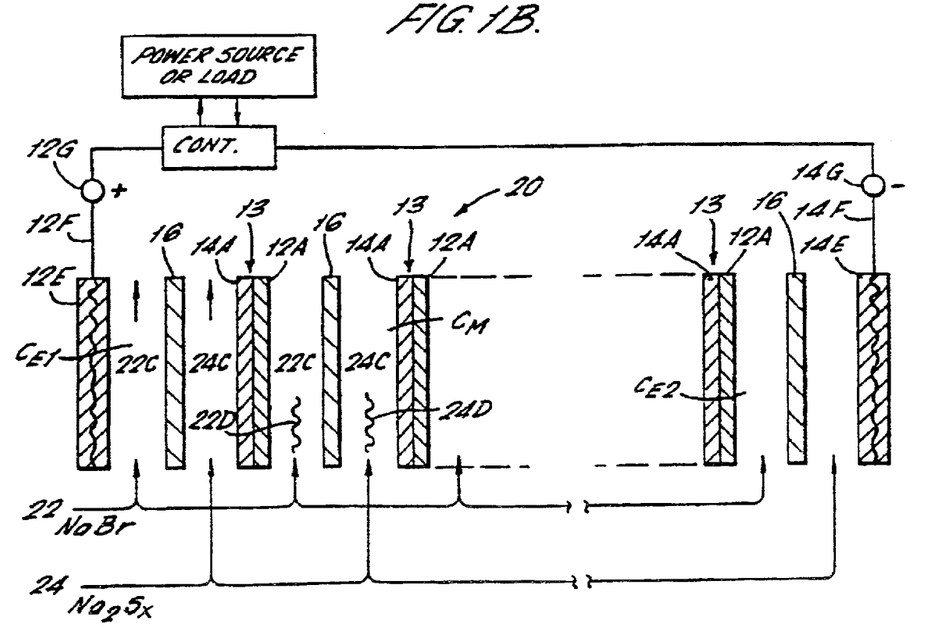
FIG. 1B is a diagram of cell arrays using the system of FIG. 1A.

FIG. 1B shows an array 20 of multiple cells connected in electrical series and fluid parallel. Multiple mid-electrodes 13 (each one having a $+^{ve}$ electrode side 12A and $-^{ve}$ electrode side 14A) and end electrodes 12E ($+^{ve}$) and 14E ($-^{ve}$) are spaced out from each other by membranes 16 and screen or mesh spacers (22D, 24D) in all the cell chambers 22C, 24C, (portions of two of which 22D, 24D are shown by way of example) to form end cells $C_{E1}$ and $C_{E2}$ and an array of mid cells $C_M$ (typically 10–20; but note much smaller and much higher numbers of cells can be accommodated). The end electrodes 12E ($+^{ve}$) and 14E ($-^{ve}$) have internal conductors 12F and 14F (typically copper screens) encapsulated therein and leading to external terminals 12G, 14G which are connected to external loads (e.g. to motor(s) via a control circuit (CONT), the motor(s) may be used to drive a vehicle) or power sources (e.g. utility power grid when used as a load-levelling device).

Figure 2:
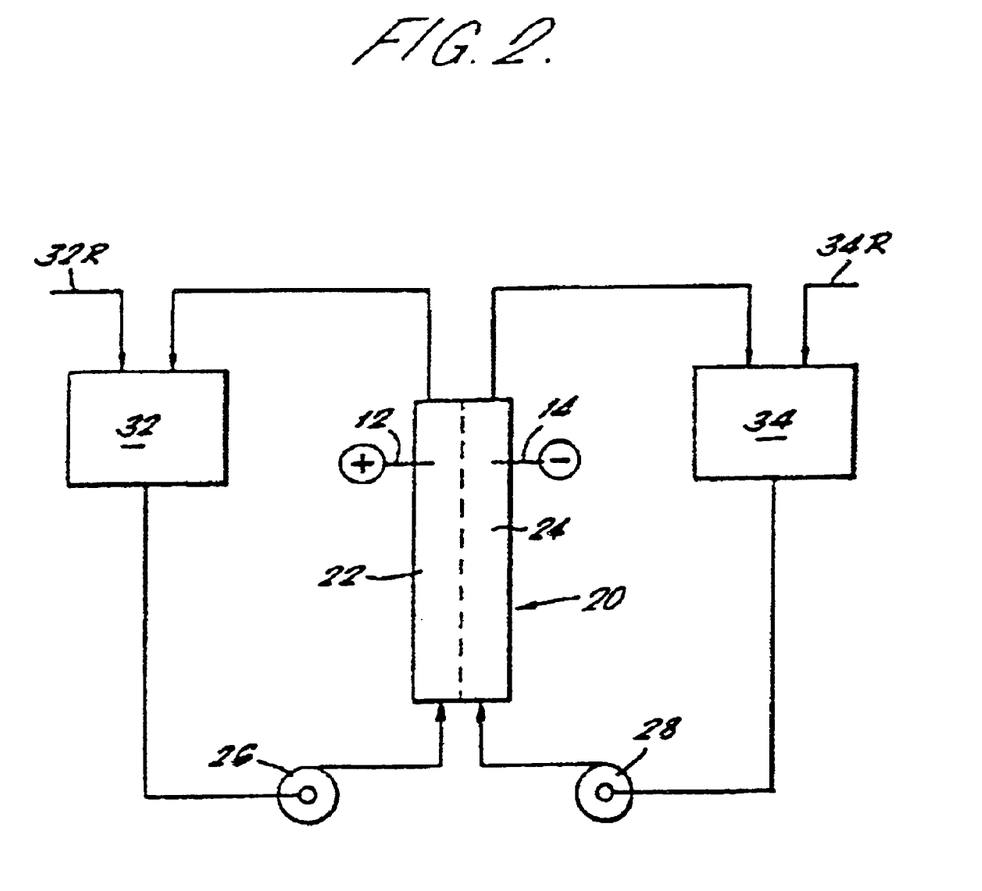
FIG. 2 is a block diagram of a fluid flow system using the cell of FIG. 1A.

FIG. 2 shows a free flow system, a power generation/storage system utilizing one or more of the batteries or cell array formats 20. Each cell 20 receives electrolyte through pumps 26 and 28 for the NaBr and $Na_2S_x$ solutions (22 and 24, respectively). The electrolytes 22 and 24 are stored in containers 32 and 34. The tanks 32, 34 can be replaced with freshly charged electrolyte by substituting tanks containing fresh electrolyte and/or refilling them from charged supply sources via lines 32R, 34R with corresponding lines (not shown) provided for draining spent (discharged) reagent. The electrolytes 22 and 24 are pumped from tanks 32 and 34, respectively, into the respective chambers 22C and 24C by means of pumps 26 and 28.

Figure 3:
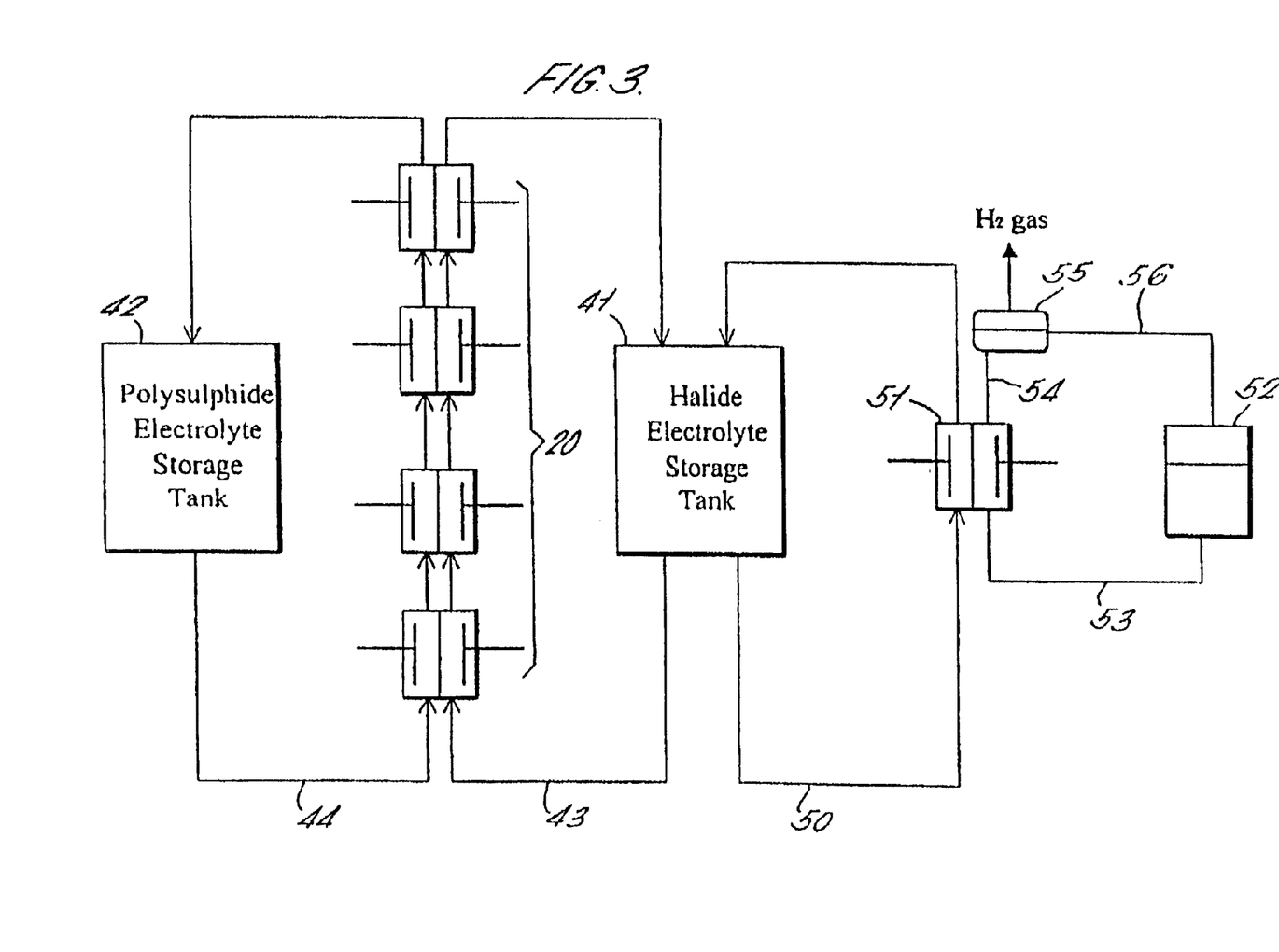
FIG. 3 is a flow diagram of an apparatus for carrying out a preferred embodiment of the process of the present invention.

FIG. 3 shows a free flow system in which an array of cells 20 are supplied with bromine/bromide and sulfide/polysulfide electrolyte from storage tanks 41 and 42 via lines 43 and 44. Bromine/bromide electrolyte may be removed from storage tank 41 via line 50 which transfers it to an external electrochemical cell 51 wherein the bromide is oxidised to bromine as a half-cell reaction in an electrochemical process. The other half-cell reaction involves the reduction of water to hydrogen and hydroxide ions. An aqueous electrolyte is stored in tank 52 and transported to the electrochemical cell 51 via line 53. The reduced electrolyte is passed via line 54 to tank 55 where hydrogen gas which is generated by the electrochemical reaction may be vented from the system. The electrolyte returns via line 56 to storage tank 52.

Figure 4:
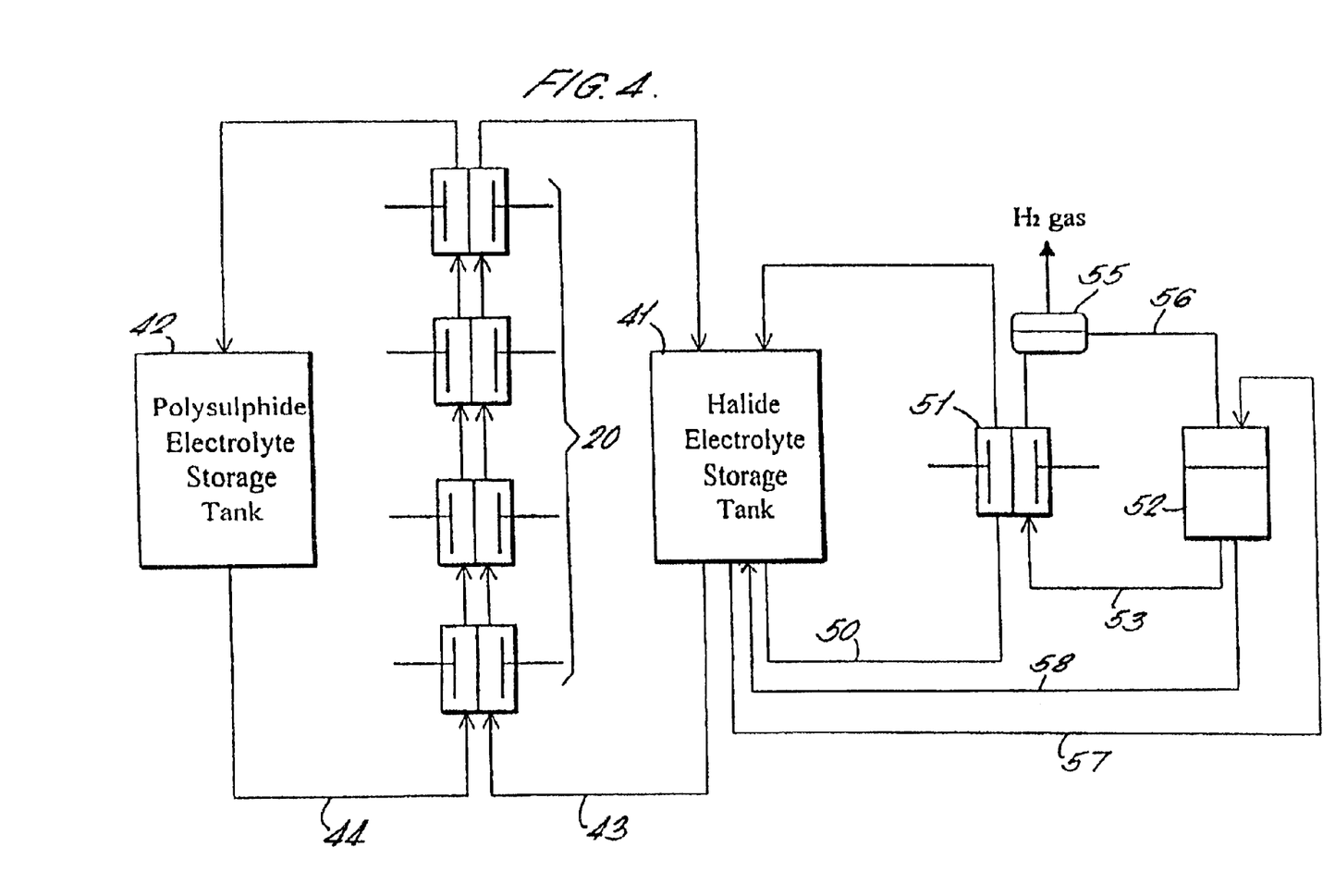
FIG. 4 is a flow diagram of an apparatus for carrying out a preferred embodiment of the process of the present invention.

FIG. 4 shows a particularly preferred variation of the free flow system illustrated in FIG. 3. In this embodiment the aqueous electrolyte which is reduced in the external electrochemical cell 51 is also bromine/bromide electrolyte which has been removed from storage tank 41 to tank 52 via line 57. In this case, the reduction reaction will initially involve reduction of any residual bromine to bromide and will subsequently involve reduction of water to hydrogen and hydroxide ions. The reduced electrolyte may be subsequently returned to the storage tank 41 along line 58.

Figure 5:
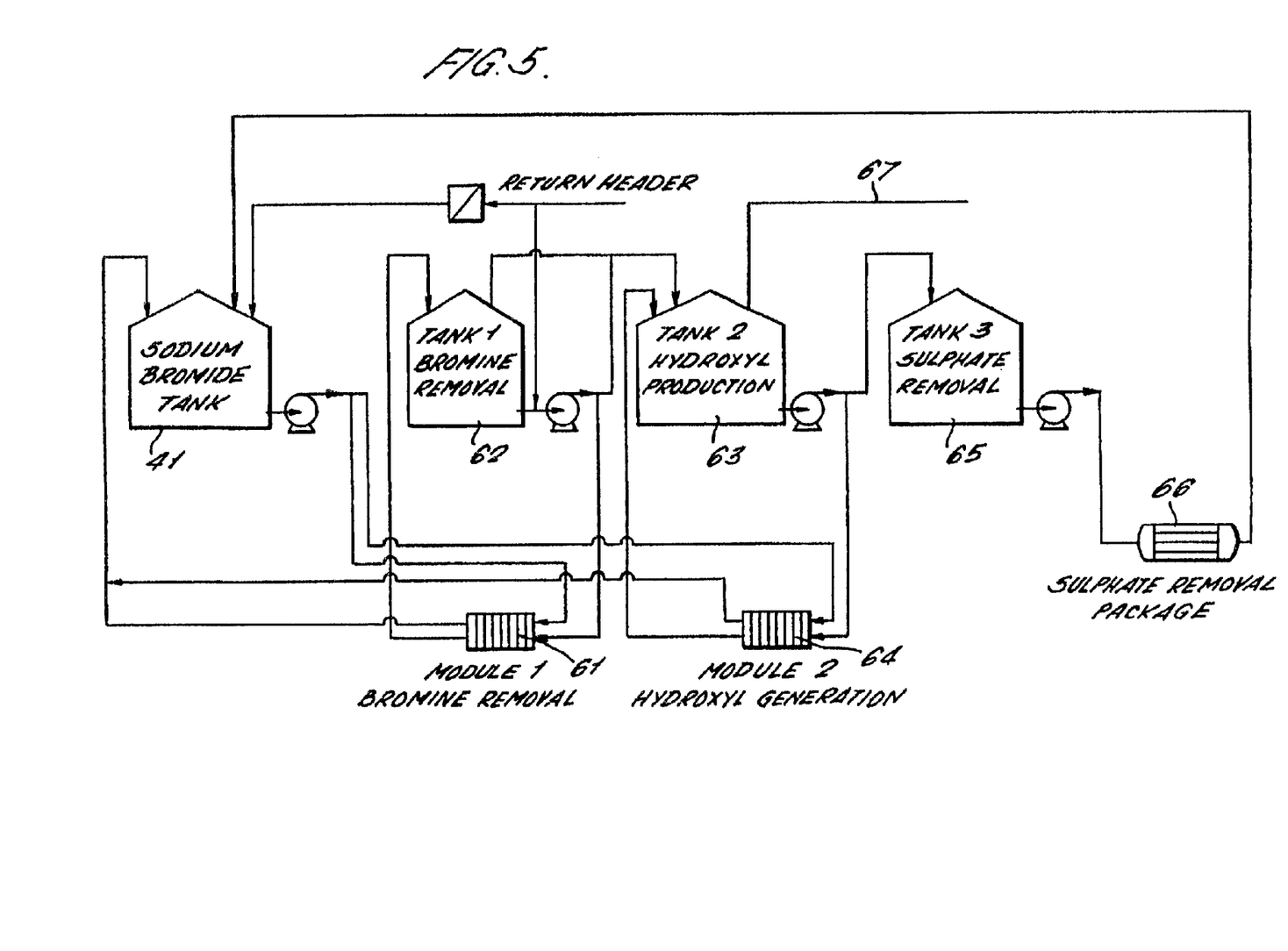
FIG. 5 is a schematic diagram of an apparatus for carrying out a further preferred embodiment of the process of the present invention, including the removal of sulfate.

Referring to FIG. 5, a schematic flow diagram is shown of the manner in which the electrolyte may be treated. A storage tank 41 contains the aqueous bromine/bromide electrolyte which may be circulated around the main RFC system (not shown). The first treatment of a first stream of the electrolyte from tank 41 is to remove free bromine by treatment in an appropriate bromine reduction module 61 which comprises an auxiliary cell. The electrolyte is circulated via module 61 and an intermediate storage tank 62 until the bromine present in the electrolyte is reduced to bromide. When the reduction is complete the electrolyte is passed to storage tank 63. A second stream of the electrolyte from tank 41 is passed to an electrochemical cell module 64 where the bromide is oxidised to bromine as a half-cell reaction in an electrochemical process. The other half-cell reaction involves the reduction of water to hydrogen and hydroxyl ions using as the electrolyte for the hydroxyl ion production the electrolyte from storage tank 63. The stream of electrolyte passing through module 64 in which bromide has been oxidised to bromine is returned to the storage tank 41. The stream of electrolyte used in the complementary half-cell reaction may be passed to a further tank 65 where it is then subjected to a sulfate removal treatment according to the teaching of WO-A-00/03448 in module 66. The stream of electrolyte from which the sulfate has been removed is then returned to the original storage tank 41. Storage tank 63 is provided with appropriate means to vent hydrogen produced in the water reduction reaction to a hydrogen stack along line 67.

Figure 6:
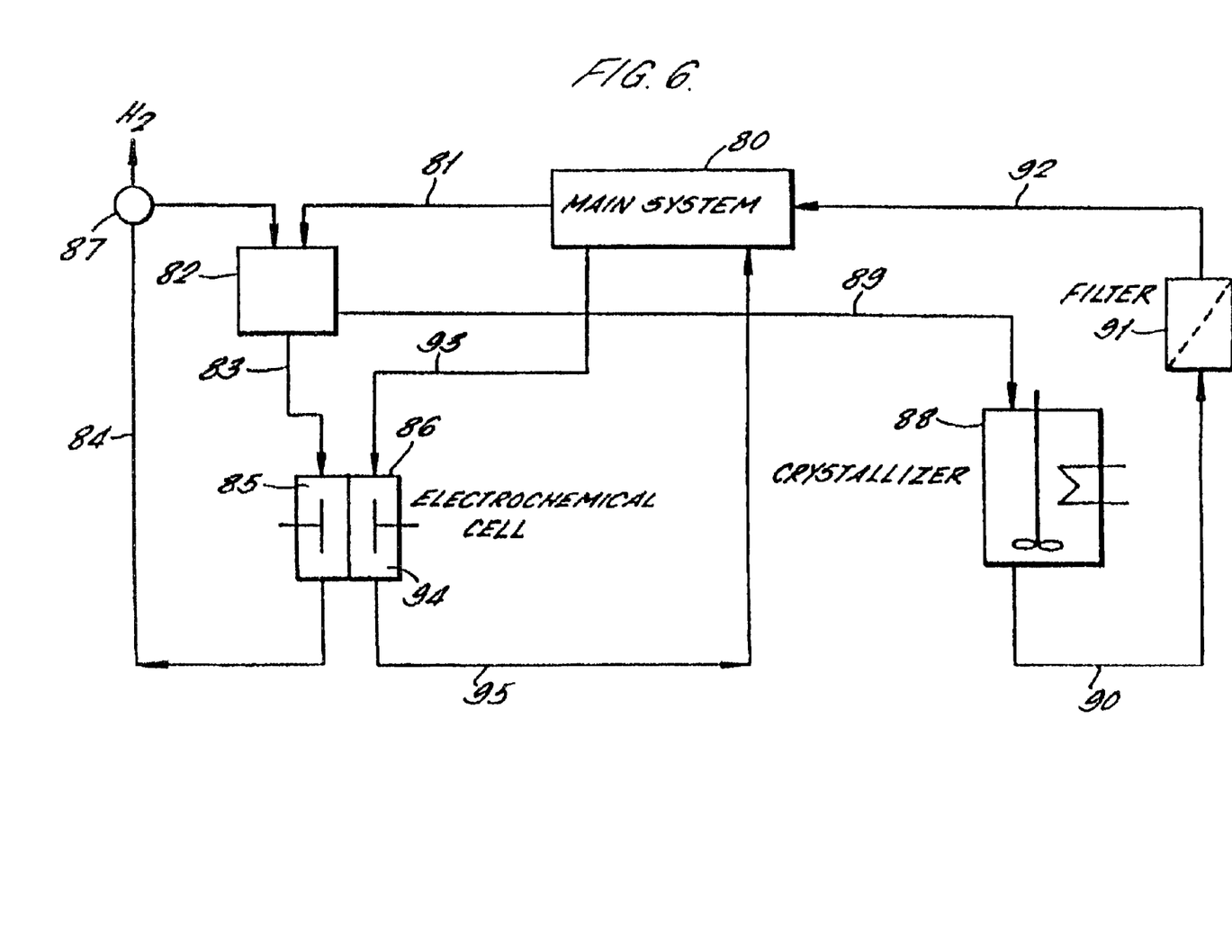
FIG. 6 is a flow diagram of an apparatus for carrying out a preferred embodiment of the process of the present invention, including the removal of sulfate.

FIG. 6 shows an alternative system for use in accordance with the present invention which includes a sulfate crystallization unit as described in WO-A-00/03448. In this system a portion of bromide/bromine electrolyte contaminated with sulfate ions is drawn from the main system 80 via line 81 and held in a receiving tank 82. This electrolyte is then circulated via lines 83 and 84 through the $-^{ve}$ chamber 85 of an auxiliary cell 86 until substantially all of the bromine present in the electrolyte has been reduced to bromide ions. The voltage applied across cell 86 is limited to ensure that reduction of water does not occur. When the current density has run down (thus indicating that the conversion of bromine to bromide is substantially complete), the voltage applied to the cell 86 is increased to a value sufficient to cause reduction of the water present in the electrolyte so as to generate $H_2$ gas and $OH^-$ ions. The electrolyte circulating through the $+^{ve}$ chamber of the external auxiliary cell is either sulfide/polysulfide or bromine/bromide electrolyte taken from the main system. The oxidation of one or the other of these electrolytes rebalances the system. The removal of water from the electrolyte is advantageous because it further increases the concentration of bromide ions thereby reducing the sulfate solubility and increasing the yield of sulfate on crystallisation. A tap 87 is provided to draw off $H_2$ gas. When sufficient rebalancing has occurred, the electrolyte circulating through the $-^{ve}$ chamber 85 is passed from the receiving tank 82 to the crystalliser 88 via line 89. This electrolyte is then passed via line 90 through a filter 91 to remove the sulfate crystals and then it may be returned to the main system via line 92. The embodiment shown in FIG. 6 shows an electrolyte being drawn from the main system via line 93, passing through the $+^{ve}$ chamber 94 of the auxiliary cell and returning the main system via line 95.

The present invention will now be further described by reference to the following examples.

COMPARATIVE EXAMPLE 1

A regenerative fuel cell of the type described above having sulfide/polysulfide and bromine/bromide electrolytes was set up. The cell had the following specifications:

| | |
|---|---|
| electrode material: | polyethylene impregnated with activated carbon |
| electrode area: | 2000 cm$^2$ |
| current density: | 80 mA/cm$^2$ |
| electrolyte volume: | 91 per electrolyte |
| cycle time: | 6 hours (i.e. 3 hours charge and 3 hours discharge) |
| flow rate: | 1000 ml/min |
| membrane material: | Nafion 115 ™ |

Figure 7:
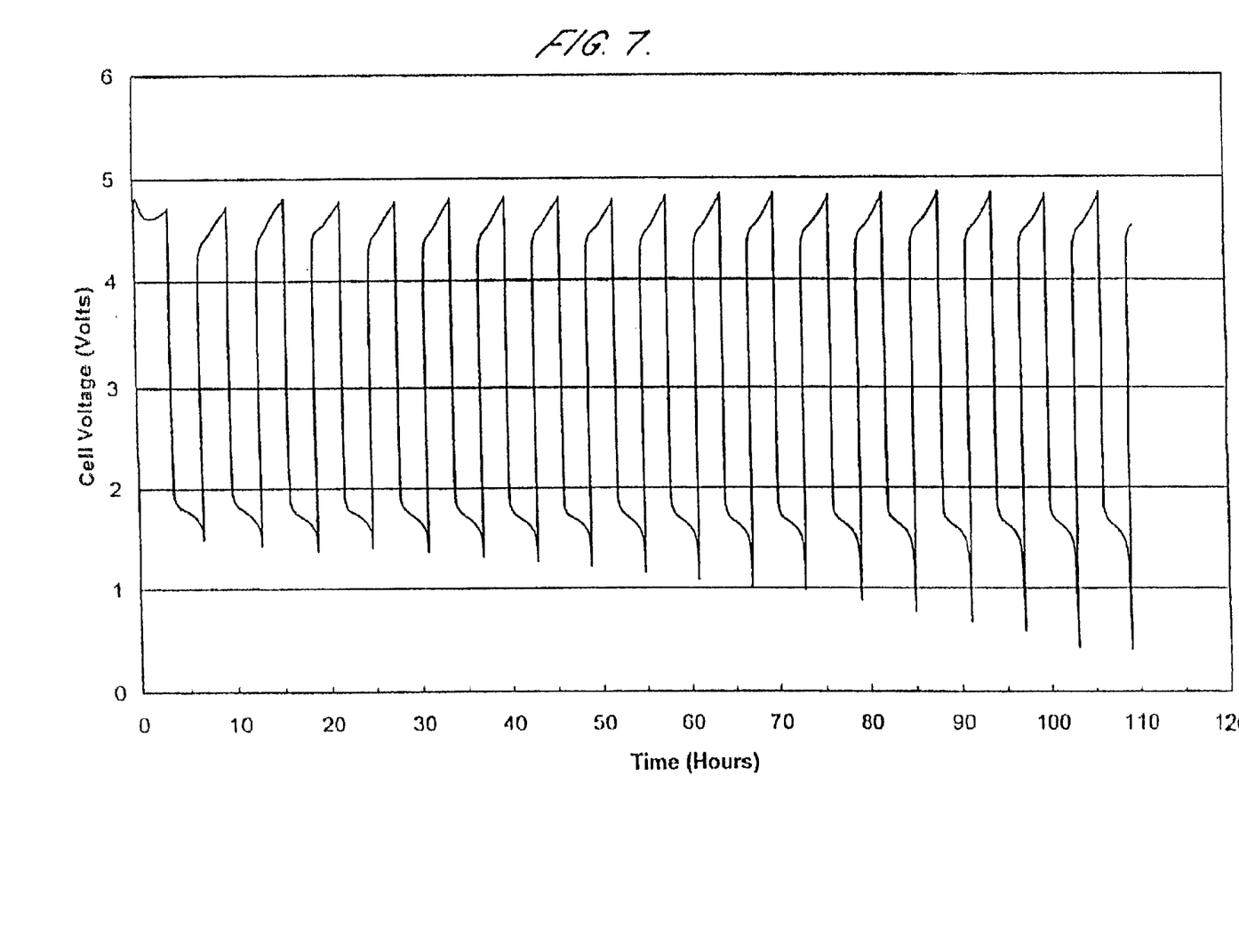
FIG. 7 is a graph of voltage versus time for a selected number of cycles of a RFC which does not incorporate a rebalancing process in accordance with the present invention.

The cell was operated over 18 cycles (108 hours) and the cell voltage was monitored throughout this period. The results are shown in FIG. 7. It can be seen that after a limited number of cycles (about 7) the cell voltage limits early on the discharge cycle due to the lack of bromine. This problem gets worse as the number of cycles increases. It can be clearly seen on the graph that after about 12 cycles (72 hours) the cell fails to maintain a good voltage performance over the whole of the 3 hour discharge cycle.

EXAMPLE 1

An identical RFC to that used in Comparative Example 1 was set up. This time the electrolytes were continuously rebalanced by oxidation of a sidestream of the bromide/bromine electrolyte drawn from the mainstream. Oxidation occurred in one half of an external electrochemical cell wherein the electrolyte undergoing reduction in the other half of the cell was dilute aqueous sodium hydroxide. The external electrochemical cell used was an MP cell from Electrocell AB having the following specifications:

| | |
|---|---|
| anode material: | platinum |
| cathode material: | nickel |
| electrode area: | 100 cm$^2$ |
| current density: | 13 mA/cm$^2$ |
| flow rate: | 270 ml/min |
| membrane material: | Nafion 350 ™ |

Figure 8:
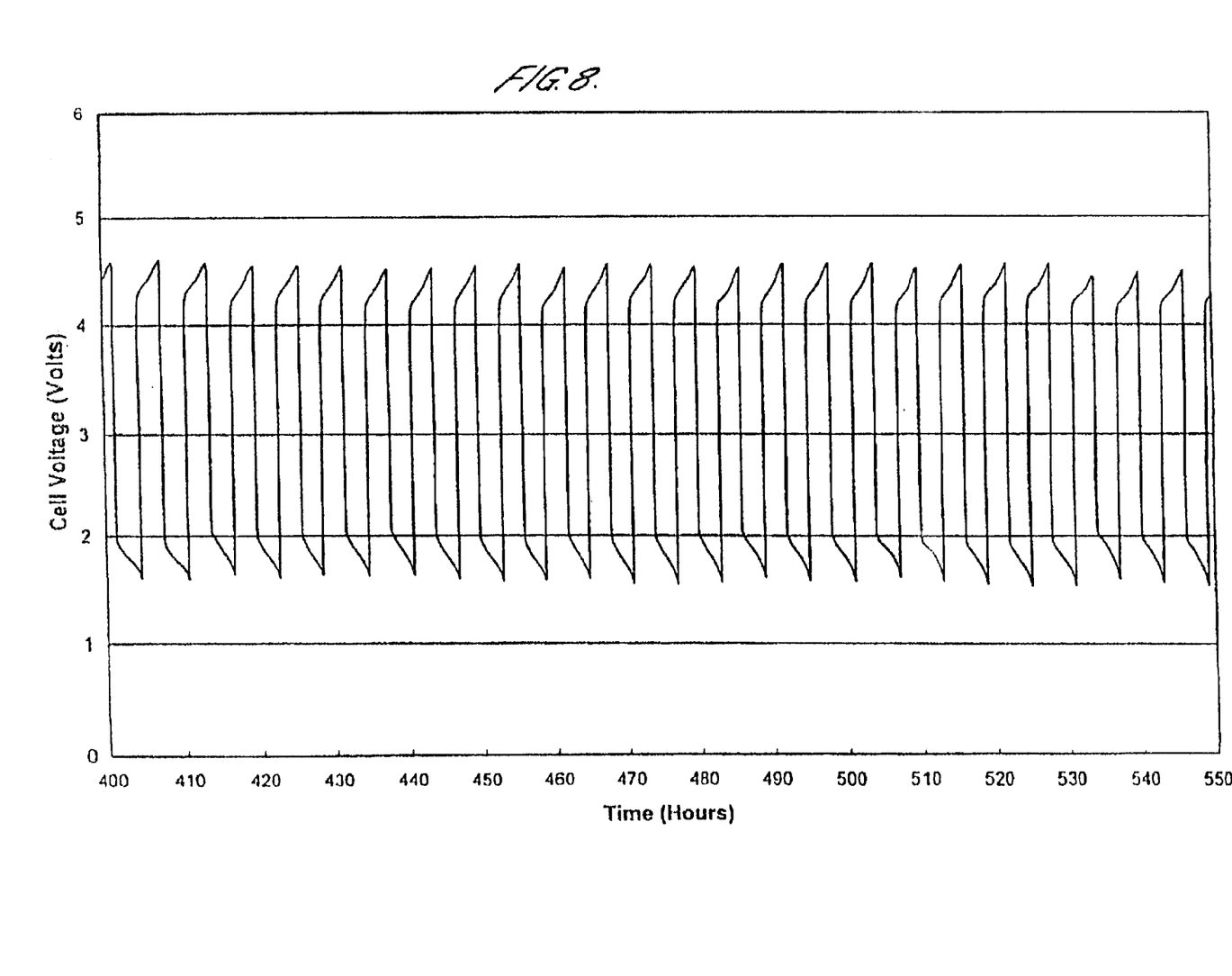
FIG. 8 is a graph of voltage versus time for a selected number of cycles of a RFC which does incorporate a rebalancing process in accordance with the present invention.

FIG.3 shows a schematic representation of the apparatus used in the present example. The cell was operated over at least 92 cycles (552 hours) and the cell voltage was monitored throughout this period. The results from the period from 400 to 550 hours are shown in FIG. 8. It can be seen that even after 91 cycles (546 hours) the cell voltage does not limit early on the discharge cycle as occurred in the unbalanced cell. The cell retains a good voltage performance over the whole of the 3 hour discharge cycle.

What is claimed is:

1. An electrochemical process for energy storage and/or power delivery comprising:

(i) maintaining and circulating electrolyte flows in a fully liquid system in which the active constituents are fully soluble in a single cell or in an array of repeating cell structures, each cell with a positive ($+^{ve}$) chamber containing an inert $+^{ve}$ electrode and a negative ($-^{ve}$) chamber containing an inert $-^{ve}$ electrode, the chambers being separated from one another by a cation exchange membrane, the electrolyte circulating in the $-^{ve}$ chamber of each cell during power is delivery containing a sulfide (electrolyte 1), and the electrolyte circulating in the $+^{ve}$ chamber during power delivery containing bromine (electrolyte 2), (ii) restoring or replenishing the electrolytes in the $+^{ve}$ and $-^{ve}$ chambers by circulating the electrolyte from each chamber to storage means comprising a volume of electrolyte greater than the cell volume for extended delivery of power over a longer discharge cycle than the cell volume alone would permit, and (iii) rebalancing the electrolytes by circulating a fraction of electrolyte 1 or electrolyte 2 through the $+^{ve}$ chamber of ant auxiliary cell, said auxiliary cell comprising a $+^{ve}$ chamber containing an inert $+^{ve}$ electrode and a –ve chamber containing an inert $-^{ve}$ electrode, the chambers being separated from one another by a cation exchange membrane, the electrolyte circulating through the $-^{ve}$ chamber of the auxiliary cell containing water and being free from polysulfide and free from bromine during rebalancing, the auxiliary cell operating so as to oxidise sulfide ions to sulfur or bromide ions to bromine in the $+^{ve}$ chamber and so as to reduce water to hydrogen and hydroxide ions in the $-^{ve}$ chamber.

2. A process as claimed in claim 1 wherein the electrolyte circulating through the $-^{ve}$ chamber of the auxiliary cell during rebalancing is a fraction of electrolyte 1 or electrolyte 2 which has been made free of polysulfide or bromine by electrochemical reduction thereof.

3. A process as claimed in claim 2 wherein the electrochemical reduction of polysulfide or bromine is effected by recirculating the fraction of electrolyte 1 or 2 through the $-^{ve}$ chamber of auxiliary cell until all of the polysulfide or bromine has been reduced.

4. A process as claimed in claim 2 wherein the electrochemical reduction of polysulfide or bromine occurs within the $-^{ve}$ chamber of a second auxiliary cell which comprises a $+^{ve}$ chamber containing an inert $+^{ve}$ electrode and a $-^{ve}$ chamber containing an inert $-^{ve}$ electrode, the chambers being separated from one another by a cation exchange membrane, the electrolyte circulating through the $+^{ve}$ chamber being a fraction of electrolyte 1 or electrolyte 2.

5. A process as claimed in claim 4 wherein the electrochemical reduction of polysulfide or bromine is effected by recirculating the fraction of electrolyte 1 or 2 through the $-^{ve}$ chamber of the second auxiliary cell until all of the polysulfide or bromine has been reduced.

6. A process as claimed in claim 3 wherein the electrolyte circulating through the $-^{ve}$ chamber of the auxiliary cell during rebalancing is a fraction of electrolyte 2 and wherein the fraction 18 subsequently treated to remove sulfate ions contained therein.

7. A process as claimed in claim 6 wherein said sulfate ions are removed by crystallisation of a sulfate salt from the fraction of electrolyte 2.

8. A process as claimed in claim 2 wherein the fraction of electrolyte 1 or 2 which is circulated through the $-^{ve}$ chamber of the auxiliary cell is returned to the main stream of electrolyte 1 or 2 respectively.

9. A process as claimed in claim 1 which additionally comprises adding elemental sulfur and/or a sulfide salt to electrolyte 1 in an amount sufficient to restore the initial concentration of sulfur spades.

10. A process for rebalancing electrolyes in a process for energy storage and/or power delivery comprising:
   (i) maintaining and circulating electrolyte flows in a fully liquid system in which the active constituents are fully soluble in a single cell or in an array of repeating cell structures, each cell with a positive ($+^{ve}$) chamber containing an inert $+^{ve}$ electrode and a negative ($-^{ve}$) chamber containing an inert $-^{ve}$ electrode, the chambers being separated from one another by a cation exchange membrane, the electrolyte circulating in the $-^{ve}$ chamber of each cell during power delivery containing a sulfide (electrolyte 1), and the electrolyte circulating in the $+^{ve}$ chamber during power delivery containing bromine (electrolyte 2),
   (ii) restoring or replenishing the electrolytes in the $+^{ve}$ and $-^{ve}$ chambers by circulating the electrolyte from each chamber to storage means comprising a volume of electrolyte greater than the cell volume for extended delivery of power over a longer discharge cycle than the cell volume alone would permit, and
   (iii) circulating a fraction of electrolyte 1 or electrolyte 2 through the $+^{ve}$ chamber of an auxiliary cell, said auxiliary cell comprising a $+^{ve}$ chamber containing an inert $+^{ve}$ electrode and a $-^{ve}$ chamber containing an inert $-^{ve}$ electrode, the chambers being separated from one another by a cation exchange membrane, the electrolyte circulating through the $-^{ve}$ chamber of the auxiliary cell containing water and being free from polysulfide and free from bromine during rebalancing, the auxiliary cell operating so as to oxidise sulfide ions to polysulfide or bromide ions to bromine in the $+^{ve}$ chamber and so as to reduce water to hydrogen and hydroxide ions in the $-^{ve}$ chamber, for the purpose of rebalancing electrolytes 1 and 2.

11. An electrochemical apparatus for energy storage and/or power delivery comprising:
   (i) a single cell or an array of repeating cell structures, each cell comprising; a $+^{ve}$ chamber containing an inert $+^{ve}$ electrode and a $-^{ve}$ chamber containing an inert $-^{ve}$ electrode the chambers being separated from one another by an ion exchange membrane, an electrolyte circulating in the $-^{ve}$ chamber of each cell which contains a sulfide during power delivery (electrolyte 1), and an electrolyte circulating in the $+^{ve}$ chamber which contains bromine during power delivery (electrolyte 2),
   (ii) storage and circulation means for each electrolyte for restoring or replenishing the electrolytes in the $+^{ve}$ and $-^{ve}$ chambers,
   (iii) means for rebalancing the electrolytes comprising an auxiliary cell which comprises a $+^{ve}$ chamber containing an inert $+^{ve}$ electrode and a $-^{ve}$ chamber containing an inert $-^{ve}$ electrode the chambers being separated from one another by cation exchange membrane, means for circulating fraction of electrolyte 1 or 2 through the $+^{ve}$ chamber of the auxiliary cell, an electrolyte containing water and being free from polysulfide and free from bromine during rebalancing and means for circulating said electrolyte through the $-^{ve}$ chamber of the auxiliary cell.

12. Apparatus as claimed in claim 11 wherein the means for circulating an electrolyte through the $-^{ve}$ chamber of the auxiliary cell comprises means for circulating a fraction of electrolyte 1 or 2 through the $-^{ve}$ chamber of the auxiliary cell.

13. Apparatus as claimed in claim 11 wherein the means for circulating an electrolyte through the $-^{ve}$ chamber of the auxiliary cell comprises a storage tank into which a fraction of electrolyte 1 or 2 may be transferred and means for re-circulating the fraction of electrolyte 1 or 2 between the $-^{ve}$ chamber of the auxiliary cell and said storage tank.

14. Apparatus as claimed in claim 12 which additionally comprises a second auxiliary cell which comprises a $+^{ve}$ chamber containing an inert $+^{ve}$ electrode and a $-^{ve}$ chamber containing an inert $-^{ve}$ electrode, the chambers being separated from one another by a cation exchange membrane, means for circulating a fraction of electrolyte 1 or 2 through the $+^{ve}$ chamber and means for circulating a fraction of electrolyte 1 or 2 through the $-^{ve}$ chamber.

15. Apparatus as claimed in claim 14 wherein the means for circulating an electrolyte through the $-^{ve}$ chamber of the second auxiliary cell comprises a storage tank into which a fraction of electrolyte 1 or 2 may be transferred and means for re-circulating the fraction of electrolyte 1 or 2 between the $-^{ve}$ chamber of the second auxiliary cell and said storage tank.

16. Apparatus as claimed in claim 12 wherein the electrolyte circulated through the $-^{ve}$ chamber of the auxiliary cell is electrolyte 2, additionally comprising means for removing sulfate ions from the fraction of electrolyte 2 after circulation through the $-^{ve}$ chamber of the auxiliary cell.

17. Apparatus as claimed in claim 16 wherein the means for removing sulfate ions from electrolyte 2 comprises a crystalliser.

18. Apparatus as claimed in claim 11 additionally comprising means for passing the fraction of electrolyte 1 or 2 which is circulated through the $-^{ve}$ chamber of the auxiliary cell back to the main stream of electrolyte 1 or 2 respectively.

19. An apparatus for rebalancing electrolytes in an electrochemical apparatus for energy storage and/or power delivery comprising:

(i) a single cell or an array of repeating cell structures, each cell comprising; a $+^{ve}$ chamber containing an inert $+^{ve}$ electrode and a $-^{ve}$ chamber containing an inert $-^{ve}$ electrode the chambers being separated from one another by an ion exchange membrane, an electrolyte circulating in the $-^{ve}$ chamber of each cell which contains a sulfide during power delivery (electrolyte 1), and an electrolyte circulating in the $+^{ve}$ chamber which contains bromine during power delivery (electrolyte 2), and (ii) storage and circulation means for each electrolyte for restoring or replenishing the electrolytes in the $+^{ve}$ and $-^{ve}$ chambers, and (iii) an auxiliary cell which comprises; a $+^{ve}$ chamber containing an inert $+^{ve}$ electrode and a $-^{ve}$ chamber containing an inert $-^{ve}$ electrode the chambers being separated from one another by a cation exchange membrane, means for passing a fraction of electrolyte 1 or 2 through the $+^{ve}$ of the auxiliary cell, an electrolyte containing water and being free from polysulfide and free from bromine during rebalancing and means for circulating said electrolyte through the $-^{ve}$ chamber of the auxiliary cell for the purpose of rebalancing electrolytes 1 and 2.

* * * * *